United States Patent
Kasuga et al.

(10) Patent No.: US 9,724,634 B2
(45) Date of Patent: Aug. 8, 2017

(54) HONEYCOMB FILTER AND METHOD FOR PRODUCING HONEYCOMB FILTER

(75) Inventors: Takafumi Kasuga, Ibi-gun (JP); Misako Makino, Ibi-gun (JP); Kazuki Nakamura, Ibi-gun (JP); Yuichi Nagatsu, Ibi-gun (JP); Takeshi Ushida, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 260 days.

(21) Appl. No.: 14/389,366

(22) PCT Filed: Mar. 30, 2012

(86) PCT No.: PCT/JP2012/058749
§ 371 (c)(1),
(2), (4) Date: Sep. 29, 2014

(87) PCT Pub. No.: WO2013/145320
PCT Pub. Date: Oct. 3, 2013

(65) Prior Publication Data
US 2015/0059305 A1   Mar. 5, 2015

(51) Int. Cl.
*B01D 39/14*   (2006.01)
*B01D 39/20*   (2006.01)
(Continued)

(52) U.S. Cl.
CPC ......... *B01D 46/2474* (2013.01); *B01D 39/20* (2013.01); *B01D 46/0001* (2013.01);
(Continued)

(58) Field of Classification Search
CPC B01D 46/2474; B01D 39/20; B01D 46/0001; B01D 46/2466;
(Continued)

(56) References Cited

U.S. PATENT DOCUMENTS 8,343,431 B2 *   1/2013   Tokuda ............. B01D 46/2425
                                                          422/180
9,175,587 B2 *   11/2015  Goto ................. B01D 46/2474
                               (Continued)

FOREIGN PATENT DOCUMENTS

DE   102008042372   4/2009
EP   2158956        3/2010
(Continued)

OTHER PUBLICATIONS

International Search Report for corresponding International Application No. PCT/JP2012/058749, Dec. 18, 2012.
(Continued)

*Primary Examiner* — Amber R Orlando
(74) *Attorney, Agent, or Firm* — Mori & Ward, LLP

(57) ABSTRACT

An object of the present invention is to provide a honeycomb filter capable of achieving a combination of high collection efficiency and low pressure loss. The honeycomb filter comprises a ceramic honeycomb substrate in which a multitude of cells through which a fluid flows are disposed in parallel in a longitudinal direction and are separated by cell walls, each cell being sealed at an end section at either the fluid inlet side or the fluid outlet side, and a filter layer which, among the surfaces of the cell walls, is formed on the surface of the cell walls of those cells in which the end section at the fluid inlet side is open and the end section at the fluid outlet side is sealed by a sealing material, wherein the thickness of the filter layer increases gradually from the fluid inlet side toward the fluid outlet side.

11 Claims, 8 Drawing Sheets

(51) Int. Cl.

| | | |
|---|---|---|
| *B01D 50/00* | (2006.01) | |
| *B01D 39/06* | (2006.01) | |
| *B01D 46/24* | (2006.01) | |
| *C04B 41/85* | (2006.01) | |
| *C04B 35/565* | (2006.01) | |
| *C04B 37/00* | (2006.01) | |
| *C04B 41/00* | (2006.01) | |
| *C04B 41/50* | (2006.01) | |
| *B01D 46/00* | (2006.01) | |
| *F01N 3/022* | (2006.01) | |
| *C04B 111/00* | (2006.01) | |

(52) U.S. Cl.
CPC .......... *C04B 35/565* (2013.01); *C04B 37/005* (2013.01); *C04B 41/009* (2013.01); *C04B 41/5089* (2013.01); *C04B 41/85* (2013.01); *F01N 3/0222* (2013.01); *B01D 46/2466* (2013.01); *C04B 2111/00793* (2013.01); *C04B 2235/5224* (2013.01); *C04B 2235/5445* (2013.01); *C04B 2235/5472* (2013.01); *C04B 2237/083* (2013.01); *C04B 2237/09* (2013.01); *C04B 2237/365* (2013.01); *F01N 2310/06* (2013.01); *F01N 2330/06* (2013.01); *F01N 2330/30* (2013.01); *Y02T 10/20* (2013.01)

(58) Field of Classification Search
CPC ... C04B 2111/00793; C04B 2235/5224; C04B 2235/5445; C04B 2235/5472; C04B 2237/083; C04B 2237/09; C04B 2237/365; C04B 35/565; C04B 37/005; C04B 41/009; C04B 41/5089; C04B 41/85; F01N 2310/06; F01N 2330/06; F01N 2330/30; F01N 3/0222; Y02T 10/20

See application file for complete search history.

(56) References Cited

U.S. PATENT DOCUMENTS

| | | |
|---|---|---|
| 2005/0011174 A1 | 1/2005 | Hong et al. |
| 2006/0008396 A1* | 1/2006 | Wursthorn ......... B01D 46/2425 422/180 |
| 2008/0314008 A1 | 12/2008 | Komori et al. |
| 2011/0212831 A1* | 9/2011 | Goto ................. B01D 46/2474 502/100 |
| 2012/0070346 A1 | 3/2012 | Mizutani et al. |

FOREIGN PATENT DOCUMENTS

| | | |
|---|---|---|
| JP | 61-129016 | 6/1986 |
| JP | 2009-511242 | 3/2009 |
| JP | 2010-227743 | 10/2010 |
| JP | 2011-78899 | 4/2011 |
| JP | 2011-147931 | 8/2011 |
| WO | 2004/024293 | 3/2004 |
| WO | 2007/039579 | 4/2007 |
| WO | 2010/110011 | 9/2010 |
| WO | 2012/030533 | 3/2012 |

OTHER PUBLICATIONS

Written Opinion for corresponding International Application No. PCT/JP2012/058749, Dec. 18, 2012.

Extended European Search Report for corresponding EP Application No. 12872861.5-1354, Mar. 3, 2016.

* cited by examiner

Fluid inlet side ← → Fluid outlet side

Cross-sectional view along line A-A (a)

(b)

(c)

(a)

(b)

(c)

(a)

(b)

(c)

HONEYCOMB FILTER AND METHOD FOR PRODUCING HONEYCOMB FILTER

TECHNICAL FIELD

The present invention relates to a honeycomb filter and a method for producing a honeycomb filter.

BACKGROUND ART

The exhaust gas discharged from internal combustion engines such as diesel engines contains particulate matter (hereinafter also referred to as PM) such as soot and the like, and in recent years, the harm caused to people and the environment by this PM has become an issue. Furthermore, because the exhaust gas also contains harmful gas components such as CO, HC and $NO_x$, the effect of these harmful gas components on people and the environment is also a cause for concern.

Accordingly, in order to trap the PM in the exhaust gas and purge the harmful gas components, an exhaust gas cleaning device is used.

This type of exhaust gas cleaning device is prepared using a honeycomb filter composed of a material such as a ceramic. The exhaust gas can be cleaned by passing the exhaust gas through the honeycomb filter.

In a honeycomb filter used in an exhaust gas cleaning device to trap the PM in an exhaust gas, a multitude of cells separated by cell walls are disposed in parallel in the longitudinal direction, and each cell is sealed at one end. Consequently, the exhaust gas that flows into a given cell necessarily passes through a cell wall that separates the cells, and then flows out of another cell. In other words, if this type of honeycomb filter is provided in an exhaust gas cleaning device, then the PM contained in the exhaust gas is captured by the cell walls as it passes through the honeycomb filter. Accordingly, the cell walls of the honeycomb filter function as a filter that cleans the exhaust gas.

In the initial stage of PM trapping by the honeycomb filter, the PM infiltrates the fine pores in the cell walls and is trapped inside the cell walls, generating a "depth filtration" state in which the fine pores in the cell walls are blocked. In this depth filtration state, PM continues to accumulate inside (the fine pores in) the cell walls. As a result, a problem can occur in that immediately after the trapping of PM begins, the effective porosity of the cell walls is reduced, causing the pressure loss to suddenly increase.

Patent Document 1 discloses a honeycomb filter in which a composite region is formed by depositing particles on the surface layer portions of the cell walls that constitute the honeycomb filter.

PRIOR ART DOCUMENTS

Patent Documents

Patent Document 1: WO 2010/110011 pamphlet

DISCLOSURE OF INVENTION

Problems Invention Aims to Solve

In Patent Document 1, the particles that are deposited in order to form the composite region are supplied and deposited by a gas-solid two phase flow. In Patent Document 1, the height of the composite region is prescribed as being not more than 80 μm from the outermost contour of the partition wall, and it is thought that a composite region of uniform thickness is formed across the entire surface layer portion of the cell walls.

The composite region (hereinafter referred to as a "filter layer" in the present specification) has a role of accumulating and trapping PM on the filter layer, and it is thought that a thicker filter layer enables a larger amount of PM to be accumulated. On the other hand, when the thickness of the filter layer is large, it becomes more difficult for the exhaust gas to pass through the filter layer, so that pressure loss tends to increase.

A velocity of the exhaust gas introduced into the honeycomb filter is assumed to increase at the end section at the fluid outlet side, and the PM contained within the exhaust gas is carried along by the gas flow and tends to easily reach the end section at the fluid outlet side.

As a result, the PM tends to be deposited in large amounts at the end section at the fluid outlet side. In contrast, the amount of PM deposition at the end section at the fluid inlet side tends to be small.

As a result of this tendency of the velocity of the exhaust gas introduced into the honeycomb filter, and the properties of the filter layer, the PM is deposited in large amounts at the end section at the fluid outlet side. This causes a shortage of thickness of the filter layer, resulting in a reduction in the collection efficiency because a portion of the PM may not be trapped.

Further, a portion of the PM that passes through the filter layer may become trapped inside the cell walls, resulting in a "depth filtration" state.

On the other hand, at the end section at the fluid inlet side, even though the amount of deposited PM is small, the thickness of the filter layer is excessively thick, which can cause an increase in pressure loss.

The present invention has been developed in light of the above circumstances, and has objects of providing a honeycomb filter capable of achieving a combination of high collection efficiency and low pressure loss, and providing a method for producing such a honeycomb filter.

Means for Solution of the Problems

In order to achieve the above objects, a honeycomb filter according to an embodiment of the invention comprises:
a ceramic honeycomb substrate in which a multitude of cells through which a fluid flows are disposed in parallel in a longitudinal direction and are separated by cell walls, each cell being sealed at an end section at either the fluid inlet side or the fluid outlet side, and
a filter layer which, among the surfaces of the cell walls, is formed on the surface of the cell walls of those cells in which the end section at the fluid inlet side is open and the end section at the fluid outlet side is sealed by a sealing material, wherein
the thickness of the filter layer increases gradually from the fluid inlet side toward the fluid outlet side.

FIG. 1 is a graph illustrating the relationship between the velocity of the exhaust gas and the location inside the cell of the honeycomb filter.

The horizontal axis represents the relative position, where the end section at the fluid inlet side is deemed to be 0 and the end section at the fluid outlet side is deemed to be 1.0, and the vertical axis represents the relative velocity.

The dark-colored line in the graph illustrates the relationship between the velocity of the exhaust gas and the location inside the cell of the honeycomb filter in which no filter layer has been formed. Based on this graph it is evident that the velocity of an exhaust gas introduced into the honeycomb filter increases suddenly at the fluid outlet side.

It is thought that because the velocity of the exhaust gas at the fluid outlet side is high, a large amount of PM is deposited at the fluid outlet side, causing an increase in pressure loss.

The light-colored line in the graph illustrates the relationship between the velocity of the exhaust gas and the location inside the cell of the honeycomb filter in which a filter layer has been formed so that the thickness of the filter layer increases gradually from the fluid inlet side toward the fluid outlet side.

Based on this graph it is evident that by providing a thicker filter layer at the fluid outlet side, the velocity of the exhaust gas at the fluid outlet side is reduced.

In the present invention, by forming the filter layer thickly at the fluid outlet side, the velocity of the exhaust gas at the fluid outlet side is reduced, thereby enabling the amount of PM deposited at the fluid outlet side to be reduced. On the other hand, by increasing the velocity of the exhaust gas at the fluid inlet side, the amount of PM deposited at the fluid inlet side is increased.

However, because the filter layer at the fluid inlet side is formed thinly, pressure loss does not increase.

As a result, the pressure loss for the overall honeycomb filter can be lowered.

Further, if a thick filter layer is provided at the fluid outlet side, then a large amount of PM can be accumulated on the outlet side filter layer without any leakage. As a result, the collection efficiency can be enhanced.

A honeycomb filter according to an embodiment of the invention comprises:

a ceramic honeycomb substrate in which a multitude of cells through which a fluid flows are disposed in parallel in a longitudinal direction and are separated by cell walls, each cell being sealed at an end section at either the fluid inlet side or the fluid outlet side, and a filter layer which, among the surfaces of the cell walls, is formed on the surface of the cell walls of those cells in which the end section at the fluid inlet side is open and the end section at the fluid outlet side is sealed by a sealing material, wherein a thin layer region in which the thickness of the filter layer is thinnest exists between the fluid inlet side and the fluid outlet side, and the thickness of the filter layer decreases gradually from the fluid inlet side toward the thin layer region, and increases gradually from the thin layer region toward the fluid outlet side.

In the honeycomb filter according to the embodiment, because the thickness of the filter layer at the outlet side is large, a large amount of PM can be accumulated on the outlet side filter layer without any leakage. As a result, the collection efficiency can be enhanced.

Further, the thin layer region in which the thickness of the filter layer is thinnest exists between the fluid inlet side and the fluid outlet side.

Unlike the fluid outlet side, the thin layer region is not a region in which a large amount of PM is deposited, and therefore a thick filter layer is unnecessary. Accordingly, by providing the thin layer region, pressure loss can be reduced.

In a honeycomb filter according to the embodiment, among the surfaces that constitute the sealing material, the filter layer is formed on the surfaces of the sealing material that are exposed inside the cells.

If the filter layer is formed on the surfaces of the sealing material that are exposed inside the cells, then because the filter layer is formed as a continuous layer, detachment of the outlet side filter layer is prevented.

In a honeycomb filter according to the embodiment, the thickness of the filter layer, measured at a single point within an arbitrary region located at a length of 87.5 to 92.5% of the total length of the ceramic honeycomb substrate in the longitudinal direction from the end section at the fluid inlet side, is from 10 to 50 µm.

The thickness of the filter layer measured in the above region reflects the thickness of the outlet side filter layer. If the thickness is less than 10 µm, then there is a possibility that a problem may arise in which a large amount of PM leaks out. Further, if the thickness exceeds 50 µm, then the pressure loss at the fluid outlet side may become too high.

In a honeycomb filter according to the embodiment, the porosity of the ceramic honeycomb substrate is from 55 to 70%.

In a honeycomb filter having a comparatively high porosity of 55 to 70%, PM passes relatively easily through the cell walls and the collection efficiency is comparatively low, and therefore increasing the thickness of the filter layer to improve the collection efficiency is particularly effective.

By increasing the thickness of the outlet side filter layer, a high collection efficiency can be maintained even with a honeycomb filter having a comparatively high porosity. In other words, the concept of increasing the thickness of the outlet side filter layer is particularly suitable for application to a honeycomb filter having a comparatively high porosity.

In a honeycomb filter according to a sixth aspect of the invention, the filter layer is composed of a heat-resistant oxide, and in a honeycomb filter according to the embodiment, the heat-resistant oxide is at least one selected from the group consisting of alumina, silica, mullite, ceria, zirconia, cordierite, zeolite and titania.

When the filter layer is composed of a heat-resistant oxide, then even when a regeneration process is performed to incinerate the PM, problems such as melting of the filter layer do not occur. As a result, a honeycomb filter having excellent heat resistance can be obtained.

In a honeycomb filter according to the embodiment, the ceramic honeycomb substrate comprises silicon carbide or a silicon-containing silicon carbide.

Silicon carbide and silicon-containing silicon carbides have a high degree of hardness and an extremely high thermal decomposition temperature. As a result, the honeycomb filter becomes a honeycomb filter that exhibits excellent mechanical properties and heat resistance.

In a honeycomb filter according to the embodiment, the cells that constitute the ceramic honeycomb substrate consist of large volume cells and small volume cells, wherein the cross-sectional area of a cross section perpendicular to the longitudinal direction of the large volume cells is larger than the cross-sectional area of a cross section perpendicular to the longitudinal direction of the small volume cells. As a result, compared with a honeycomb filter in which the cross-sectional areas of all the cells are the same, the filtration area is larger, and a larger amount of PM can be accumulated before a regeneration process is performed.

In a honeycomb filter according to a tenth aspect of the invention, the shape of the cross section perpendicular to the longitudinal direction of the large volume cells is substantially octagonal, and the shape of the cross section perpendicular to the longitudinal direction of the small volume cells is substantially tetragonal. Consequently, the large volume cells and the small volume cells can easily be arranged with good symmetry, so that a honeycomb filter having excellent mechanical strength is obtained where distortion or the like is unlikely to occur.

In a honeycomb filter according to an eleventh aspect of the invention, the shape of the cross section perpendicular to the longitudinal direction of the large volume cells is substantially tetragonal, and the shape of the cross section perpendicular to the longitudinal direction of the small volume cells is substantially tetragonal.

As a result, the large volume cells and the small volume cells which constitute the ceramic honeycomb substrate can easily be arranged with good symmetry, so that a honeycomb filter having excellent mechanical strength is obtained where distortion or the like is unlikely to occur.

In a honeycomb filter according to a twelfth aspect of the invention, the shape of the cross section perpendicular to the longitudinal direction of the large volume cells is substantially hexagonal, and the shape of the cross section perpendicular to the longitudinal direction of the small volume cells is substantially hexagonal.

A method for producing a honeycomb filter according to the embodiment is a method for producing a honeycomb filter comprising:
  a ceramic honeycomb substrate in which a multitude of cells through which a fluid flows are disposed in parallel in a longitudinal direction and are separated by cell walls, each cell being sealed at an end section at either the fluid inlet side or the fluid outlet side, and
  a filter layer which, among the surfaces of the cell walls, is formed on the surface of the cell walls of those cells in which the end section at the fluid inlet side is open and the end section at the fluid outlet side is sealed by a sealing material,
  the method comprising:
  a honeycomb calcined body production step of producing, from ceramic powders, a porous honeycomb calcined body in which a multitude of cells are disposed in parallel in a longitudinal direction and are separated by cell walls, each cell being sealed at an end section at either the fluid inlet side or the fluid outlet side,
  a droplet dispersion step of dispersing droplets containing a raw material of spherical ceramic particles in a carrier gas,
  a drying step of drying the carrier gas at 100 to 800° C., thereby forming spherical ceramic particles from the droplets containing the raw material of the spherical ceramic particles,
  an inflow step of introducing the carrier gas into those cells in which the end section at the fluid inlet side is open and the end section at the fluid outlet side is sealed, at a carrier gas flow rate from 4 to 20 mm/s or from 1 to 3 mm/s, calculated by formula (1) shown below, thereby depositing the spherical ceramic particles on the surface of the cell walls, and
  a heating step of heating the ceramic honeycomb substrate to 1100 to 1500° C.

Carrier gas flow rate=volume of gas introduced into ceramic honeycomb substrate per unit of time ($mm^3/s$)/PM trapping area of ceramic honeycomb substrate ($mm^2$) (1)

The PM trapping area of the ceramic honeycomb substrate ($mm^2$) is the total surface area of the inner walls of all the fluid inlet side cells. However, the area of the sealing material is excluded.

In the production method described above, the droplets containing the raw material of the spherical ceramic particles are dispersed in the carrier gas, and the carrier gas is dried at 100 to 800° C. By drying the carrier gas, the moisture within the droplets dispersed in the carrier gas can be removed to form the spherical ceramic particles. Further, when the raw material of the spherical ceramic particles contained in the carrier gas is a precursor to a heat-resistant oxide, the precursor to the heat-resistant oxide can be converted to spherical ceramic particles in the drying step.

When introducing the thus produced spherical ceramic particles into the cells, the flow rate of the carrier gas is adjusted.

When the flow rate of the carrier gas is set to 4 to 20 minis, the thickness of the filter layer, namely the deposition amount of the spherical ceramic particles, can be adjusted so that the filter layer thickens gradually from the fluid inlet side toward the fluid outlet side.

Further, when the flow rate of the carrier gas is set to 1 to 3 mm/s, the thickness of the filter layer can be adjusted so that a thin layer region in which the thickness of the filter layer is thinnest exists between the fluid inlet side and the fluid outlet side, and the thickness of the filter layer decreases gradually from the fluid inlet side toward the thin layer region, and increases gradually from the thin layer region toward the fluid outlet side.

EMBODIMENTS FOR CARRYING OUT THE INVENTION

A more detailed description of embodiments of the present invention is provided below. However, the present invention is not limited to the embodiments described below, and various modifications can be made without departing from the scope of the present invention.

First Embodiment

Embodiments of a honeycomb filter of the present invention and a method for producing the honeycomb filter are described below as a first embodiment of the present invention.

In a honeycomb filter according to the first embodiment of the present invention, a ceramic honeycomb substrate (ceramic block) is composed of a plurality of honeycomb calcined bodies. Further, the multitude of cells of the honeycomb calcined bodies that constitute the honeycomb filter include large volume cells and small volume cells, and the area of a large volume cell in a cross section perpendicular to the longitudinal direction is larger than the area of a small volume cell in a cross section perpendicular to the longitudinal direction.

The honeycomb filter according to the first embodiment of the present invention has a filter layer formed on the surface of the cell walls of the ceramic honeycomb substrate comprising the honeycomb calcined bodies.

In this description, a structure without a filter layer formed on the surface of the cell walls is referred to as a "ceramic honeycomb substrate", and a structure with a filter layer formed on the surface of the cell walls is referred to as a "honeycomb filter", thereby distinguishing between the two.

Furthermore, in the following description, references which simply mention a cross section of a honeycomb calcined body indicate a cross section perpendicular to the longitudinal direction of the honeycomb calcined body. Similarly, references which simply mention the cross-sectional area of a honeycomb calcined body indicate the area of a cross section perpendicular to the longitudinal direction of the honeycomb calcined body.

In the present invention, the term "filter layer" refers to a layer which can trap PM and is formed on the surface of the ceramic honeycomb substrate. It is necessary that the filter layer is formed on the surface of the cell walls that constitute the ceramic honeycomb substrate, but a portion of the filter layer may also be formed inside the cell walls that constitute the ceramic honeycomb substrate.

Figure 1:
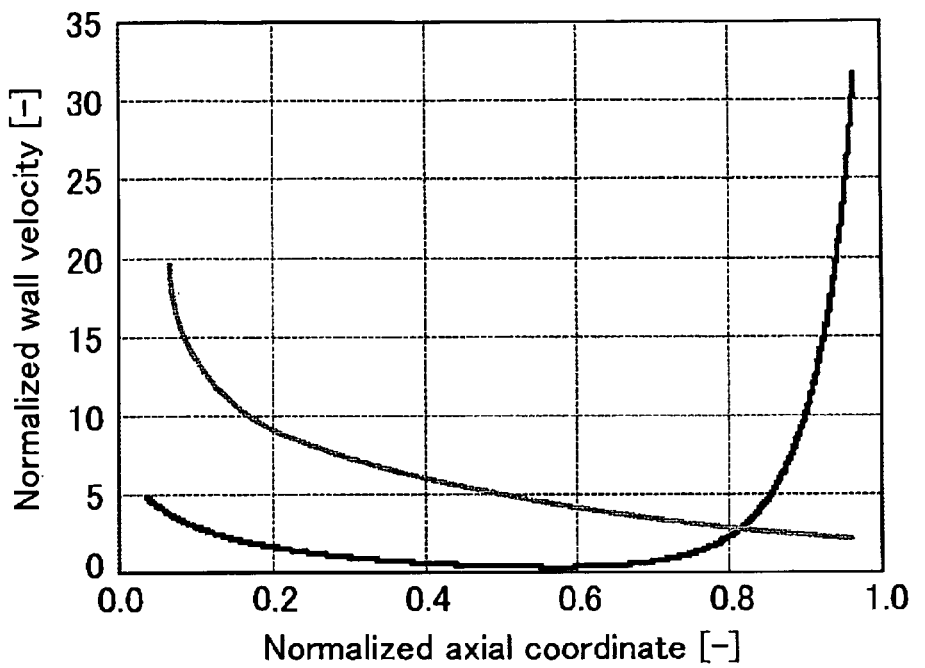
FIG. 1 is a graph illustrating the relationship between the velocity of the exhaust gas and the location inside the cell of a honeycomb filter.
Figure 2:
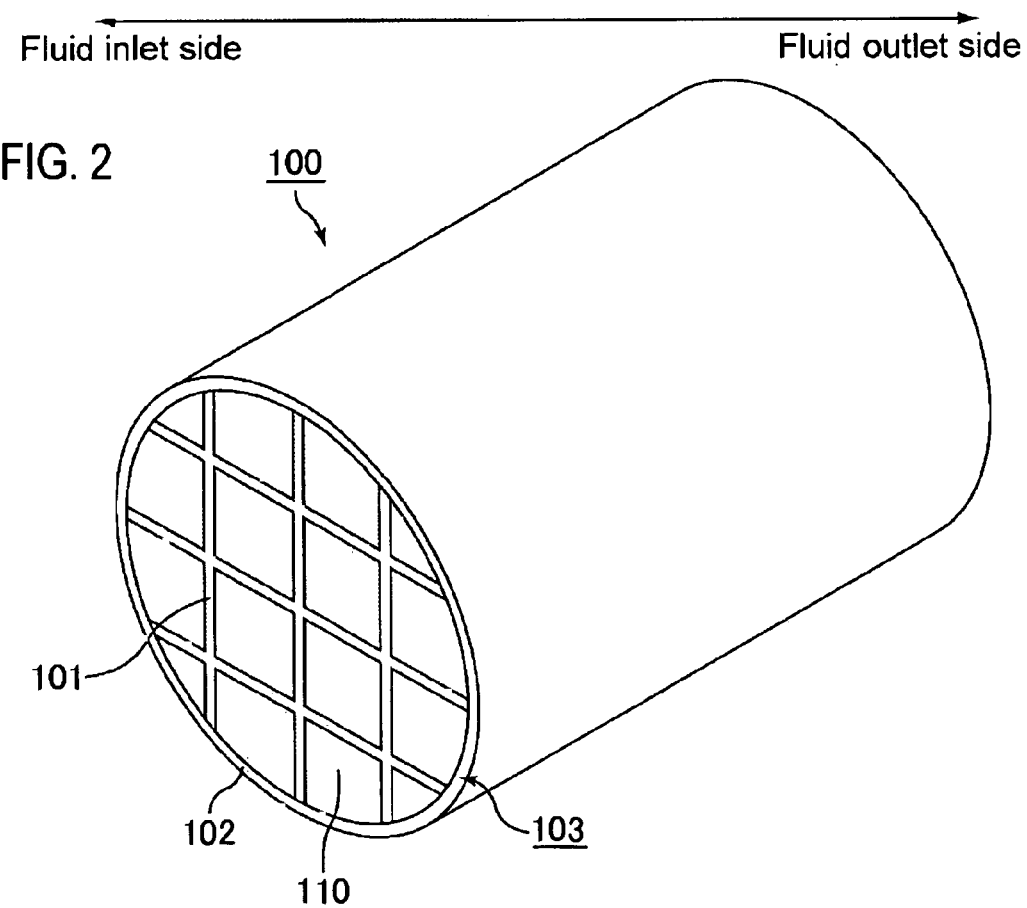
FIG. 2 is a perspective view schematically illustrating an example of a honeycomb filter according to a first embodiment of the present invention.

FIG. 2 is a perspective view schematically illustrating an example of the honeycomb filter according to the first embodiment of the present invention.

FIG. 3(a) is a perspective view schematically illustrating an example of a honeycomb calcined body that constitutes the honeycomb filter illustrated in FIG. 2. FIG. 3(b) is a cross-sectional view along the line A-A of the honeycomb calcined body illustrated in FIG. 3(a).

In the honeycomb filter 100 illustrated in FIG. 2, a plurality of honeycomb calcined bodies 110 are bundled together via adhesive material layers 101 to form a ceramic honeycomb substrate (ceramic block) 103, and an outer periphery coating layer 102 for preventing leakage of the exhaust gas is formed around the outer periphery of this ceramic honeycomb substrate (ceramic block) 103. The outer periphery coating layer may be formed as needed.

This type of honeycomb filter formed by bundling a plurality of honeycomb calcined bodies is also called an aggregated type honeycomb filter.

Although described in more detail below, the honeycomb calcined bodies 110 which constitute the honeycomb filter 100 are preferably porous bodies formed from silicon carbide or a silicon-containing silicon carbide.

The porosity of the honeycomb calcined bodies which constitute the honeycomb filter according to this embodiment of the present invention is not particularly limited, but is preferably from 55 to 70%.

In a honeycomb filter having a comparatively high porosity of 55 to 70%, PM passes relatively easily through the cell walls and the collection efficiency is comparatively low, and therefore increasing the thickness of the filter layer to improve the collection efficiency is particularly effective.

The average pore size of the honeycomb calcined bodies which constitute the honeycomb filter according to this embodiment of the present invention is preferably from 5 to 30 µm.

If the average pore size of the honeycomb calcined bodies is less than 5 µm, then the honeycomb calcined bodies become prone to blockages. On the other hand, if the average pore size of the honeycomb calcined bodies exceeds 30 µm, then particulates tend to pass through the pores in the cell walls, so that the honeycomb calcined bodies are unable to trap the particulates, being unable to function as a honeycomb filter.

The porosity and the pore size can be measured by a conventional mercury penetration method.

In the honeycomb calcined body 110 illustrated in FIG. 3(a) and FIG. 3(b), a multitude of cells 111a and 111b are disposed in parallel in the longitudinal direction (the direction of arrow a in FIG. 3(a)) and are separated by cell walls 113, and an outer peripheral wall 114 is formed at the outer periphery. One end section of each of the cells 111a and 111b is sealed by a sealing material 112a or 112b.

As illustrated in FIG. 3(b), a filter layer 115 is formed on the surface of the cell walls 113 of the honeycomb calcined body 110. The filter layer 115 is not shown in the honeycomb calcined body 110 illustrated in FIG. 3(a).

In the honeycomb calcined body 110 illustrated in FIG. 3(a) and FIG. 3(b), large volume cells 111a having a cross-sectional area perpendicular to the longitudinal direction that is relatively larger than that of small volume cells 111b, and small volume cells 111b having a cross-sectional area perpendicular to the longitudinal direction that is relatively smaller than that of the large volume cells 111a are arranged alternately.

The shape of the large volume cells 111a in a cross section perpendicular to the longitudinal direction is substantially octagonal, whereas the shape of the small volume cells 111b in a cross section perpendicular to the longitudinal direction is substantially tetragonal.

In the honeycomb calcined body 110 illustrated in FIG. 3(a) and FIG. 3(b), the end sections of the large volume cells 111a on a first end surface 117a side of the honeycomb calcined body 110 are open, and the end sections on a second end surface 117b side are sealed by the sealing material 112a. On the other hand, the end sections of the small volume cells 111b on the second end surface 117b side of the honeycomb calcined body 110 are open, and the end sections on the first end surface 117a side are sealed by the sealing material 112b.

Accordingly, as illustrated in FIG. 3(b), an exhaust gas $G_1$ introduced into a large volume cell 111a (in FIG. 3(b), the exhaust gas is indicated by $G_1$, and the flow of the exhaust gas is indicated by the arrows) necessarily flows out from a small volume cell 111b after passing through the cell wall 113 and the filter layer 115 that separate the large volume cell 111a from the small volume cell 111b. Because the PM and the like in the exhaust gas $G_1$ is trapped when the exhaust gas $G_1$ passes through the cell wall 113, the cell walls 113 and the filter layer 115 that separate the large volume cells 111a and the small volume cells 111b function as filters.

In this manner, gases such as exhaust gases can be passed through the large volume cells 111a and the small volume cells 111b of the honeycomb calcined body 110. When a gas such as an exhaust gas is introduced in the direction illustrated in FIG. 3(b), the end section on the first end surface 117a side of the honeycomb calcined body 110 (the end section where the small volume cells 111b are sealed) is called the fluid inlet side end section, and the end section on the second end surface 117b side of the honeycomb calcined body 110 (the end section where the large volume cells 111a are sealed) is called the fluid outlet side end section.

In other words, the large volume cells 111a in which the end section at the fluid inlet side is open can be called fluid inlet side cells 111a, and the small volume cells 111b in which the end section at the fluid outlet side is open can be called fluid outlet side cells 111b.

The filter layer is described below.

Figure 4:
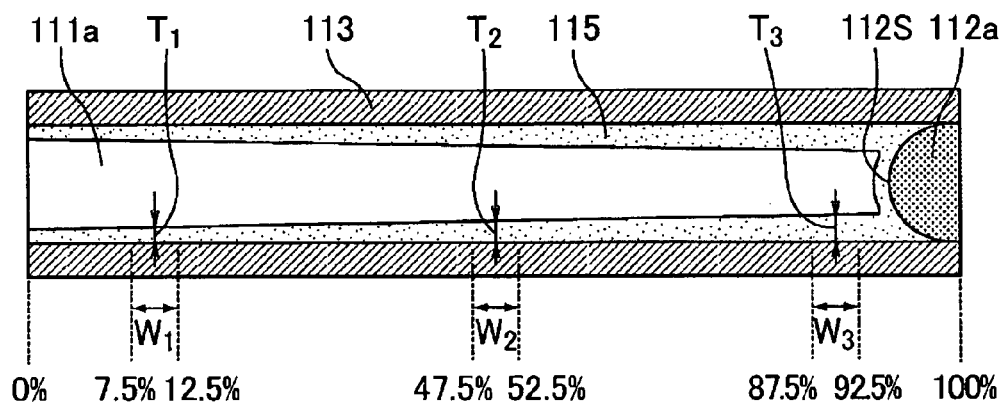
FIG. 4 is an enlarged cross-sectional view schematically illustrating an enlargement of an example of a cell in which the end section at the fluid inlet side is open and the end section at the fluid outlet side is sealed.

FIG. 4 is an enlarged cross-sectional view schematically illustrating an enlargement of an example of a cell in which the end section at the fluid inlet side is open and the end section at the fluid outlet side is sealed.

In FIG. 4, the fact that the thickness of the filter layer 115 increases gradually from the fluid inlet side toward the fluid outlet side is illustrated schematically. Further, the filter layer 115 is also formed on the surface 112S of the sealing material that is exposed inside the cell.

Further, in FIG. 4, the regions in which the thickness of the filter layer is measured from the fluid inlet side toward the fluid outlet side are also indicated schematically.

The total length of the honeycomb calcined body in the longitudinal direction is deemed to be 100%, wherein the position of the end section at the fluid inlet side is specified as 0%, and the position of the end section at the fluid outlet side is specified as 100%.

Then, positions are specified at positions 7.5% and 12.5% from the end section at the fluid inlet side toward the end section at the fluid outlet side, and the range between these two positions is specified as $W_1$. The thickness of the filter layer measured at an arbitrary single position within this range $W_1$ is the thickness $T_1$ of the inlet side filter layer.

In a similar manner, positions are specified at 47.5% and 52.5% from the end section at the fluid inlet side toward the end section at the fluid outlet side, and the range between these two positions is specified as $W_2$.

The thickness of the filter layer measured at an arbitrary single position within this range $W_2$ is the thickness $T_2$ of the central portion filter layer.

In a similar manner, positions are specified at 87.5% and 92.5% from the end section at the fluid inlet side toward the end section at the fluid outlet side, and the range between these two positions is specified as $W_3$.

The thickness of the filter layer measured at an arbitrary single position within this range $W_3$ is the thickness $T_3$ of the outlet side filter layer.

When the size relationship between the thus measured thickness $T_1$ of the inlet side filter layer, thickness $T_2$ of the central portion filter layer and thickness $T_3$ of the outlet side filter layer satisfies $T_1<T_2<T_3$, the thickness of the filter layer can be said to increase gradually from the fluid inlet side toward the fluid outlet side.

The thickness of the filter layer can be measured using the method described below.

Figure 5:
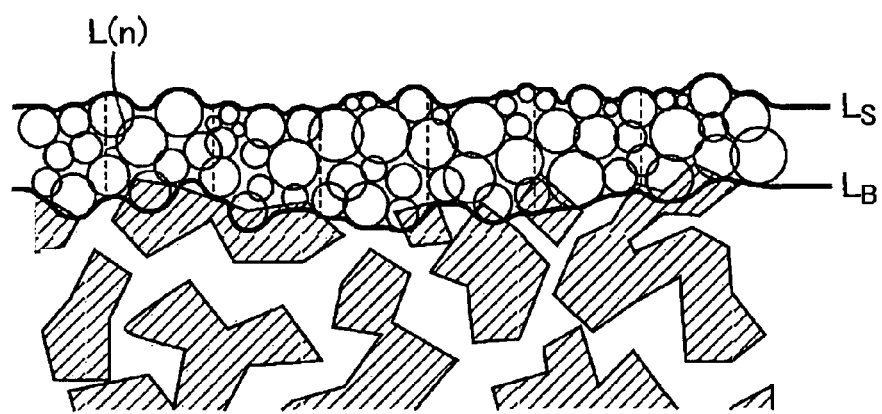
FIG. 5 is a cross-sectional view schematically illustrating a measurement method used when measuring the thickness of the filter layer.

FIG. 5 is a cross-sectional view schematically illustrating a measurement method used when measuring the thickness of the filter layer.

First, honeycomb calcined bodies within the respective ranges $W_1$, $W_2$ and $W_3$ illustrated in FIG. 4 are processed to prepare samples with dimensions of 10 mm×10 mm×10 mm.

For an arbitrary single position on each of the prepared samples, a cross section of the cell is then observed using a scanning electron microscope (SEM). The SEM imaging conditions include an accelerating voltage of 15.00 kV, a working distance (WD) of 15:00 mm, and a magnification of 500 to 1000×. In FIG. 5, in order to facilitate comprehension, a schematic illustration is shown instead of an actual SEM photograph.

Next, as illustrated in FIG. 5, a line is drawn along the bottom surfaces of the particles that constitute the filter layer, and this is deemed the bottom surface $L_B$. Further, a line is also drawn along the top surfaces of the particles that constitute the filter layer, and this is deemed the top surface $L_S$.

Subsequently, the SEM photograph is divided into 50 portions in the left-right direction (the longitudinal direction of the honeycomb calcined body). The distance between the top surface $L_S$ and the bottom surface $L_B$ is measured in a position in each of the 50 portions, and the thickness of the filter layer at the nth position (wherein n is an integer of 1 to 50) is termed L(n). The average value of L(1) to L(50) is recorded as the thickness of the filter layer.

Figure 6:
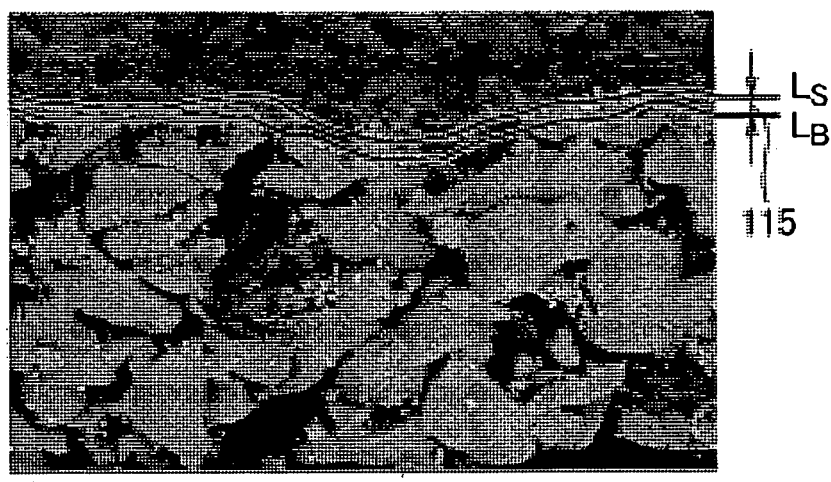
FIG. 6(a) is a cross-sectional photograph showing the inlet side filter layer.
FIG. 6(b) is a cross-sectional photograph showing the central portion filter layer.
FIG. 6(c) is a cross-sectional photograph showing the outlet side filter layer.
Figure 6:
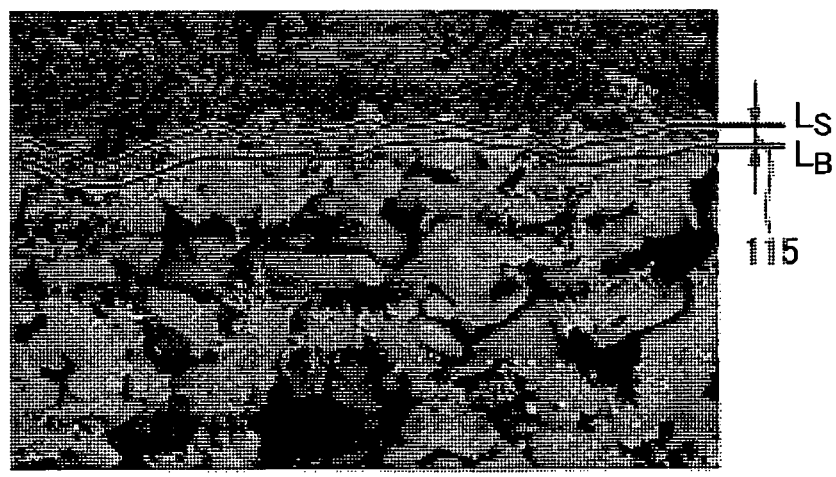
Figure 6:
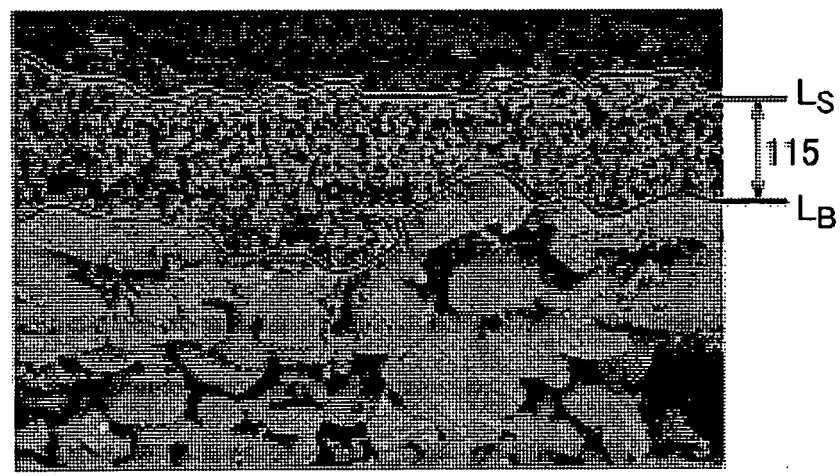

FIG. 6(a) is a cross-sectional photograph showing the inlet side filter layer, FIG. 6(b) is a cross-sectional photograph showing the central portion filter layer, and FIG. 6(c) is a cross-sectional photograph showing the outlet side filter layer.

In each cross section, lines are shown which correspond with the bottom surface $L_B$ and the top surface $L_S$.

The thickness ($T_1$) of the inlet side filter layer shown in FIG. 6(a) is 3.1 µm, the thickness ($T_2$) of the central portion filter layer is 7.3 µm, and the thickness ($T_3$) of the outlet side filter layer is 46.2 µm. The relationship between the thickness values of the filter layer satisfies $T_1<T_2<T_3$, and it can be stated that the thickness of the filter layer increases gradually from the fluid inlet side toward the fluid outlet side.

Figure 7:
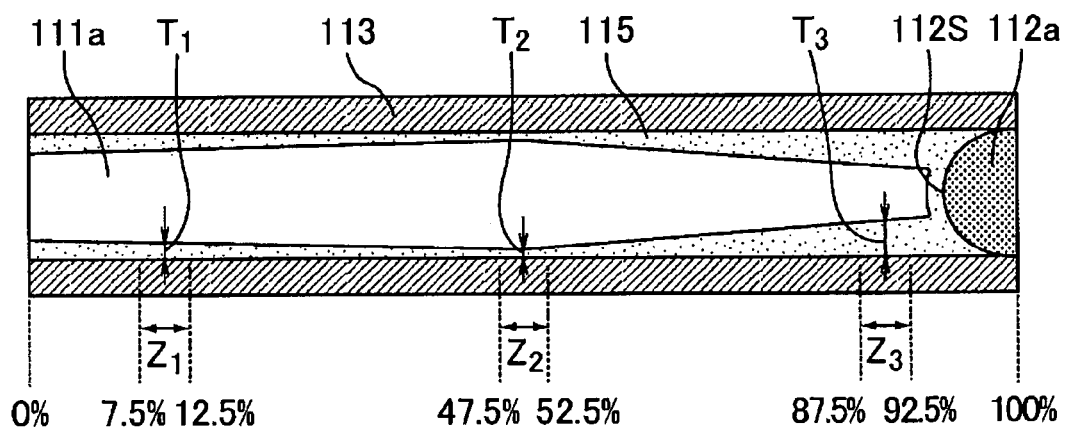
FIG. 7 is an enlarged cross-sectional view schematically illustrating an enlargement of another example of a cell in which the end section at the fluid inlet side is open and the end section at the fluid outlet side is sealed.

FIG. 7 is an enlarged cross-sectional view schematically illustrating an enlargement of another example of a cell in which the end section at the fluid inlet side is open and the end section at the fluid outlet side is sealed.

FIG. 7 schematically illustrates the case in which a thin layer region in which the thickness of the filter layer is thinnest exists between the fluid inlet side and the fluid outlet side, and the thickness of the filter layer decreases gradually from the fluid inlet side toward the thin layer region, and increases gradually from the thin layer region toward the fluid outlet side.

In a similar manner to that shown in FIG. 4, FIG. 7 also illustrates ranges $Z_1$, $Z_2$ and $Z_3$ in which the thickness of the filter layer is measured, and thickness values $T_1$, $T_2$ and $T_3$ of the filter layer.

The method used for specifying the ranges $Z_1$, $Z_2$ and $Z_3$ in which the thickness of the filter layer is measured is the same as the method used for specifying the ranges $W_1$, $W_2$ and $W_3$ shown in FIG. 4.

In the cell illustrated in FIG. 7, the thickness $T_2$ of the region between the fluid inlet side and the fluid outlet side is the thinnest. This region $Z_2$ where the thickness of the filter layer is thinnest is called the thin layer region.

Further, the thickness of the filter layer decreases gradually from the range $Z_1$ toward the range $Z_2$, and the thickness of the filter layer increases gradually from the range $Z_2$ toward the range $Z_3$.

Figure 8:
FIG. 8(a) is a cross-sectional photograph showing the inlet side filter layer.
FIG. 8(b) is a cross-sectional photograph showing the thin layer region.
FIG. 8(c) is a cross-sectional photograph showing the outlet side filter layer.
Figure 8:
Figure 8:
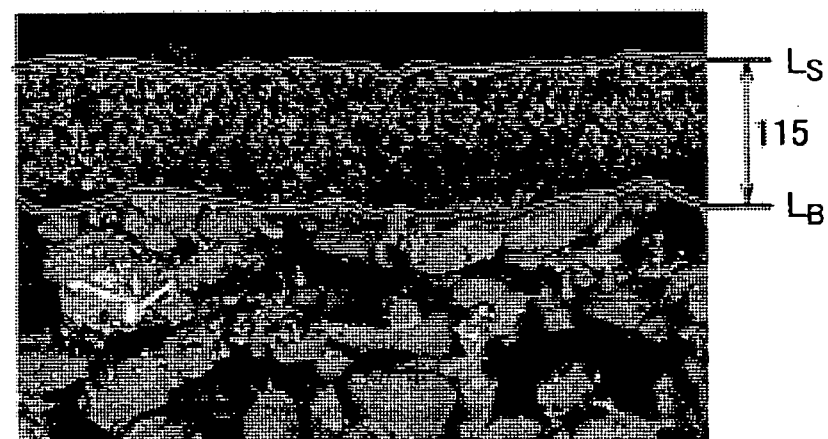

FIG. 8(a) is a cross-sectional photograph showing the inlet side filter layer, FIG. 8(b) is a cross-sectional photograph showing the thin layer region, and FIG. 8(c) is a cross-sectional photograph showing the outlet side filter layer.

In each cross section, lines are shown which correspond with the bottom surface $L_B$ and the top surface $L_S$.

The thickness ($T_1$) of the inlet side filter layer shown in FIG. 8(a) is 26.3 μm, the thickness ($T_2$) of the thin layer region is 18.4 μm, and the thickness ($T_3$) of the outlet side filter layer is 33.6 μm. The relationship between the thickness values of the filter layer satisfies $T_1>T_2$ and $T_2<T_3$, and it can be stated that a thin layer region in which the thickness of the filter layer is thinnest exists between the fluid inlet side and the fluid outlet side, and that the thickness of the filter layer decreases gradually from the fluid inlet side toward the thin layer region, and increases gradually from the thin layer region toward the fluid outlet side.

In the honeycomb filter according to the first embodiment of the present invention, the thickness of the filter layer, measured at an arbitrary single point within a region located at a length of 87.5 to 92.5% of the total length of the ceramic honeycomb substrate in the longitudinal direction from the fluid inlet side, is from 10 to 50 μm, and preferably from 30 to 50 μm. This thickness of the filter layer corresponds with the thickness $T_3$ of the outlet side filter layer.

An outlet side filter layer thickness $T_3$ of at least 10 μm is suited to accumulation of a large amount of PM without leakage. Further, when the outlet side filter layer thickness $T_3$ is not more than 50 μm, the pressure loss at the end section at the fluid outlet side does not become too high, which is preferable.

The thickness $T_1$ of the inlet side filter layer is from 10 to 30 μm, and always satisfies the relationship $T_1<T_3$.

In the honeycomb filter according to the first embodiment of the present invention, the average particle size of the particles that form the filter layer is preferably from 0.2 to 1.2 μm, more preferably from 0.2 to 0.9 μm, and still more preferably from 0.5 to 0.8 μm.

If the average particle size of the particles that constitute the filter layer is less than 0.2 μm, then the particles that constitute the filter layer may sometimes infiltrate into the interior (fine pores) of the cell walls and block the fine pores, causing pressure loss to increase. On the other hand, if the average particle size of the particles that constitute the filter layer exceeds 1.2 μm, then the particles that constitute the filter layer are too large, and even when the filter layer is formed, the pore size of the filter layer is large. Consequently, PM passes through the filter layer and infiltrates the fine pores in the cell walls, causing a "depth filtration" state in which PM is trapped inside the cell walls, which increases pressure loss.

The average particle size of the particles that constitute the filter layer can be measured by the following method.

A honeycomb calcined body which constitutes the honeycomb filter is processed to prepare a sample with dimensions of 10 mm×10 mm×10 mm.

A single arbitrary position on the surface of the prepared sample is then observed using a scanning electron microscope (SEM). At this time, the conditions are set so that the particles that constitute the filter layer appear within a single field of view. Here, as a SEM, model FE-SEM S-4800 manufactured by Hitachi, Ltd. can be used. Further, the imaging conditions for the SEM include an accelerating voltage of 15.00 kV, a working distance (WD) of 15:00 mm, and a magnification of 10,000×.

Next, the particle size of every particle within the single field of view is measured visually. The average value of the particle sizes of all the particles measured in the single field of view is deemed the average particle size.

In the honeycomb filter according to the first embodiment of the present invention, the spherical ceramic particles which constitute the filter layer are preferably composed of heat-resistant oxide ceramic particles.

Examples of the heat-resistant oxide include alumina, silica, mullite, ceria, zirconia, cordierite, zeolite, and titania. These may be used individually, or a combination of two or more types may be used.

Of the above heat-resistant oxide, alumina is preferred.

In the honeycomb filter according to the first embodiment of the present invention, among the surfaces of the cell walls, the filter layer is formed only on the surface of the cell walls of those cells in which the end section at the fluid inlet side is open and the end section at the fluid outlet side is sealed by a sealing material.

Because the exhaust gas is introduced into the cells from the fluid inlet side of the honeycomb filter, the PM in the exhaust gas is deposited in large amounts on the cell walls of those cells in which the end section at the fluid inlet side is open and the end section at the fluid outlet side is sealed. Accordingly, when the filter layer is formed on the surface, among the surfaces of the cell walls, of the cell walls of those cells in which the end section at the fluid inlet side is open and the end section at the fluid outlet side is sealed, then depth filtration of the PM deposited on these cell walls can be efficiently prevented.

In the honeycomb filter according to the first embodiment of the present invention, examples of the shapes of cross sections perpendicular to the longitudinal direction of the large volume cells and the small volume cells within the honeycomb calcined bodies include the shapes described below.

Figure 9:
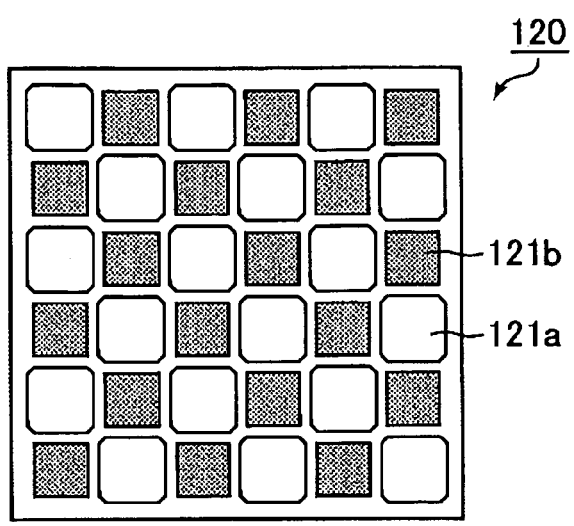
FIG. 9(a), FIG. 9(b) and FIG. 9(c) are side views schematically illustrating examples of the cell structure of the honeycomb calcined body that constitutes the honeycomb filter according to the first embodiment of the present invention.
Figure 9:
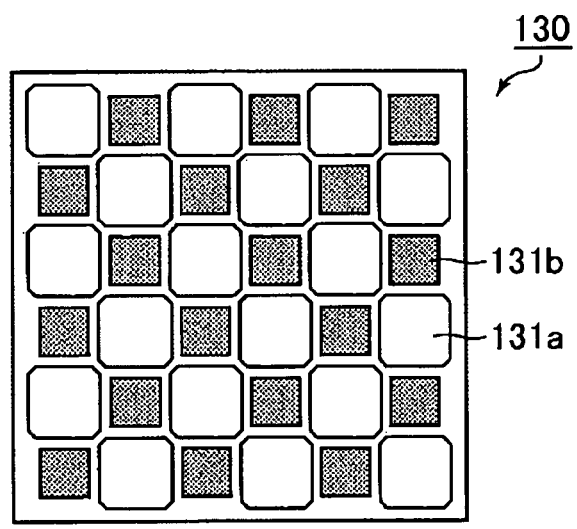
Figure 9:
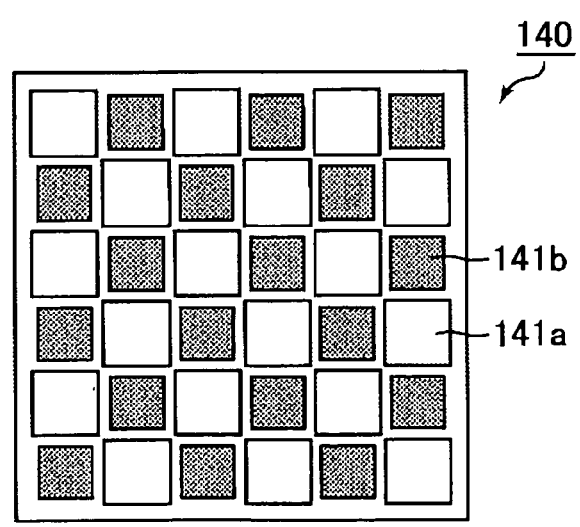

FIG. 9(a), FIG. 9(b) and FIG. 9(c) are side views schematically illustrating examples of the cell structure of a honeycomb calcined body that constitutes the honeycomb filter according to the first embodiment of the present invention.

In FIG. 9(a), FIG. 9(b) and FIG. 9(c), the filter layer is not shown.

In a honeycomb calcined body 120 illustrated in FIG. 9(a), the shape of large volume cells 121a in a cross section perpendicular to the longitudinal direction is substantially octagonal, the shape of small volume cells 121b in a cross section perpendicular to the longitudinal direction is substantially tetragonal, and the large volume cells 121a and the small volume cells 121b are arranged in an alternating pattern. Similarly, in a honeycomb calcined body 130 illustrated in FIG. 9(b), the shape of large volume cells 131a in a cross section perpendicular to the longitudinal direction is substantially octagonal, the shape of small volume cells 131b in a cross section perpendicular to the longitudinal direction is substantially tetragonal, and the large volume cells 131a and the small volume cells 131b are arranged in an alternating pattern. The honeycomb calcined body 120 illustrated in FIG. 9(a) and the honeycomb calcined body 130 illustrated in FIG. 9(b) have different area ratios between the area of a cross section perpendicular to the longitudinal direction of a large volume cell relative to the area of a cross section perpendicular to the longitudinal direction of a small volume cell (area of cross section perpendicular to the longitudinal direction of large volume cell/area of cross section perpendicular to the longitudinal direction of small volume cell).

Furthermore, in a honeycomb calcined body 140 illustrated in FIG. 9(c), the shape of large volume cells 141a in a cross section perpendicular to the longitudinal direction is substantially tetragonal, the shape of small volume cells 141b in a cross section perpendicular to the longitudinal direction is substantially tetragonal, and the large volume cells 141a and the small volume cells 141b are arranged in an alternating pattern.

In the honeycomb filter according to the first embodiment of the present invention, the area ratio of the area of a cross section perpendicular to the longitudinal direction of a large volume cell relative to the area of a cross section perpendicular to the longitudinal direction of a small volume cell (area of cross section perpendicular to the longitudinal direction of large volume cell/area of cross section perpendicular to the longitudinal direction of small volume cell) is preferably within a range from 1.4 to 2.8, and more preferably from 1.5 to 2.4.

By using the large volume cells as the fluid inlet side cells and the small volume cells as the fluid outlet side cells, a large amount of PM can be deposited on the fluid inlet side cells (large volume cells), but if the aforementioned area ratio is less than 1.4, then because the difference between the cross sectional area of the large volume cells and the cross sectional area of the small volume cells is small, the effects obtained by providing large volume cells and small volume cells are not so significant. On the other hand, if the area ratio exceeds 2.8, then the area of the cross section perpendicular to the longitudinal direction of the small volume cells becomes too small, and the friction generated when a gas such as an exhaust gas passes through the fluid outlet side cells (small volume cells) causes an increase in the pressure loss.

Next, a method for producing a honeycomb filter according to the first embodiment of the present invention is described.

A method for producing a honeycomb filter according to a first embodiment of the present invention is a method for producing a honeycomb filter comprising:
  a ceramic honeycomb substrate in which a multitude of cells through which a fluid flows are disposed in parallel in a longitudinal direction and are separated by cell walls, each cell being sealed at an end section at either the fluid inlet side or the fluid outlet side, and
  a filter layer which, among the surfaces of the cell walls, is formed on the surface of the cell walls of those cells in which the end section at the fluid inlet side is open and the end section at the fluid outlet side is sealed by a sealing material,
  the method comprising:
  a honeycomb calcined body production step of producing, from ceramic powders, a porous honeycomb calcined body in which a multitude of cells are disposed in parallel in a longitudinal direction and are separated by cell walls, each cell being sealed at an end section at either the fluid inlet side or the fluid outlet side,
  a droplet dispersion step of dispersing droplets containing a raw material of spherical ceramic particles in a carrier gas, a drying step of drying the carrier gas at 100 to 800° C., thereby forming spherical ceramic particles from the droplets containing the raw material of the spherical ceramic particles, an inflow step of introducing the carrier gas into those cells in which the end section at the fluid inlet side is open and the end section at the fluid outlet side is sealed, at a carrier gas flow rate from 4 to 20 mm/s or from 1 to 3 mm/s calculated by formula (1) shown below, thereby depositing the spherical ceramic particles on the surface of the cell walls, and a heating step of heating the ceramic honeycomb substrate to 1100 to 1500° C.

$$\text{Carrier gas flow rate} = \text{volume of gas introduced into ceramic honeycomb substrate per unit of time } (mm^3/s) / \text{PM trapping area of ceramic honeycomb substrate } (mm^2) \quad (1)$$

In the method for producing the honeycomb filter according to the first embodiment of the present invention, a ceramic honeycomb substrate containing honeycomb calcined bodies is prepared, and a filter layer is formed on the surface of the cell walls of the ceramic honeycomb substrate.

Prior to describing the other steps, the procedure for the steps for forming the filter layer is described below.

In the present embodiment, the filter layer is formed on the surface of the cell walls of the ceramic honeycomb substrate by performing the droplet dispersion step, the drying step, the carrier gas inflow step, and the ceramic honeycomb substrate heating step.

Furthermore, in the description of the present embodiment, the case in which the material that constitutes the filter layer is a heat-resistant oxide is described as an example.

The step of preparing the ceramic honeycomb substrate containing the honeycomb calcined bodies will be described later in the specification.

FIG. 10 is a cross-sectional view schematically illustrating an embodiment of the droplet dispersion step and the carrier gas inflow step.

FIG. 10 shows a carrier gas inflow device 1, which is a device that introduces the carrier gas into the cells of the ceramic honeycomb substrate.

The carrier gas inflow device 1 comprises a droplet dispersion section 20 which disperses droplets within the carrier gas, a pipe section 30 through which the carrier gas containing the dispersed droplets travels, and an inflow section 40 which introduces the carrier gas into the cells of the ceramic honeycomb substrate.

An example of using the carrier gas inflow device 1 to perform the droplet dispersion step and the carrier gas inflow step is described below.

In the carrier gas inflow device 1, a carrier gas F flows from the bottom of FIG. 10 toward the top. In the carrier gas inflow device 1, the carrier gas F is introduced from the bottom of the carrier gas inflow device 1, passes through the droplet dispersion section 20, the pipe section 30 and the inflow section 40, and is discharged from the top of the inflow section 40.

The carrier gas F is pressurized from the bottom to the top in FIG. 10, by a pressure difference produced by either a pressure applied from below the carrier gas inflow device or a suction applied from above the carrier gas inflow device, causing the carrier gas F to flow upward through the inside of the carrier gas inflow device 1.

A gas which does not react upon heating up to 800° C. and does not react with the components in the droplets dispersed within the carrier gas is used as the carrier gas.

Examples of the carrier gas include gases such as air, nitrogen, and argon.

In the droplet dispersion section 20 of the carrier gas inflow device 1, an oxide-containing solution stored in a tank not shown in the figure is converted to droplets 11 by spraying, and dispersed within the carrier gas F.

The expression "oxide-containing solution" is a concept which includes a solution containing a heat-resistant oxide precursor which forms a heat-resistant oxide upon heating, or a slurry containing heat-resistant oxide particles.

A heat-resistant oxide precursor means a compound which is converted to a heat-resistant oxide by heating.

Examples include a hydroxide, carbonate, nitrate or hydrate of the metal that constitutes the heat-resistant oxide.

Examples of the heat-resistant oxide precursor when the heat-resistant oxide is alumina, that is an alumina precursor, include aluminum nitrate, aluminum hydroxide, boehmite, and diaspore.

Furthermore, the slurry containing heat-resistant oxide particles is a solution of heat-resistant oxide particles suspended in water.

The droplets 11 dispersed in the carrier gas F flow upward through the carrier gas inflow device 1, carried by the flow of the carrier gas F, and pass through the pipe section 30.

The pipe section 30 of the carrier gas inflow device 1 is a pipe through which the carrier gas F containing the dispersed droplets 11 passes.

A channel 32 of the pipe section 30 through which the carrier gas F passes is a space enclosed by a pipe wall 31 of the pipe.

In the carrier gas inflow device 1 used in the present embodiment, a heating mechanism 33 is provided on the pipe section 30. An example of the heating mechanism 33 is an electric heater or the like.

In the present embodiment, the pipe wall 31 of the pipe is heated using the heating mechanism 33, and the carrier gas F containing the dispersed droplets 11 is passed through the pipe section 30. Accordingly, the carrier gas F that passes through the pipe section 30 is heated, thereby heating the droplets 11 dispersed within the carrier gas F. When the droplets 11 are heated, the liquid component contained in the droplets evaporates, forming spherical ceramic particles 12.

Figure 10:
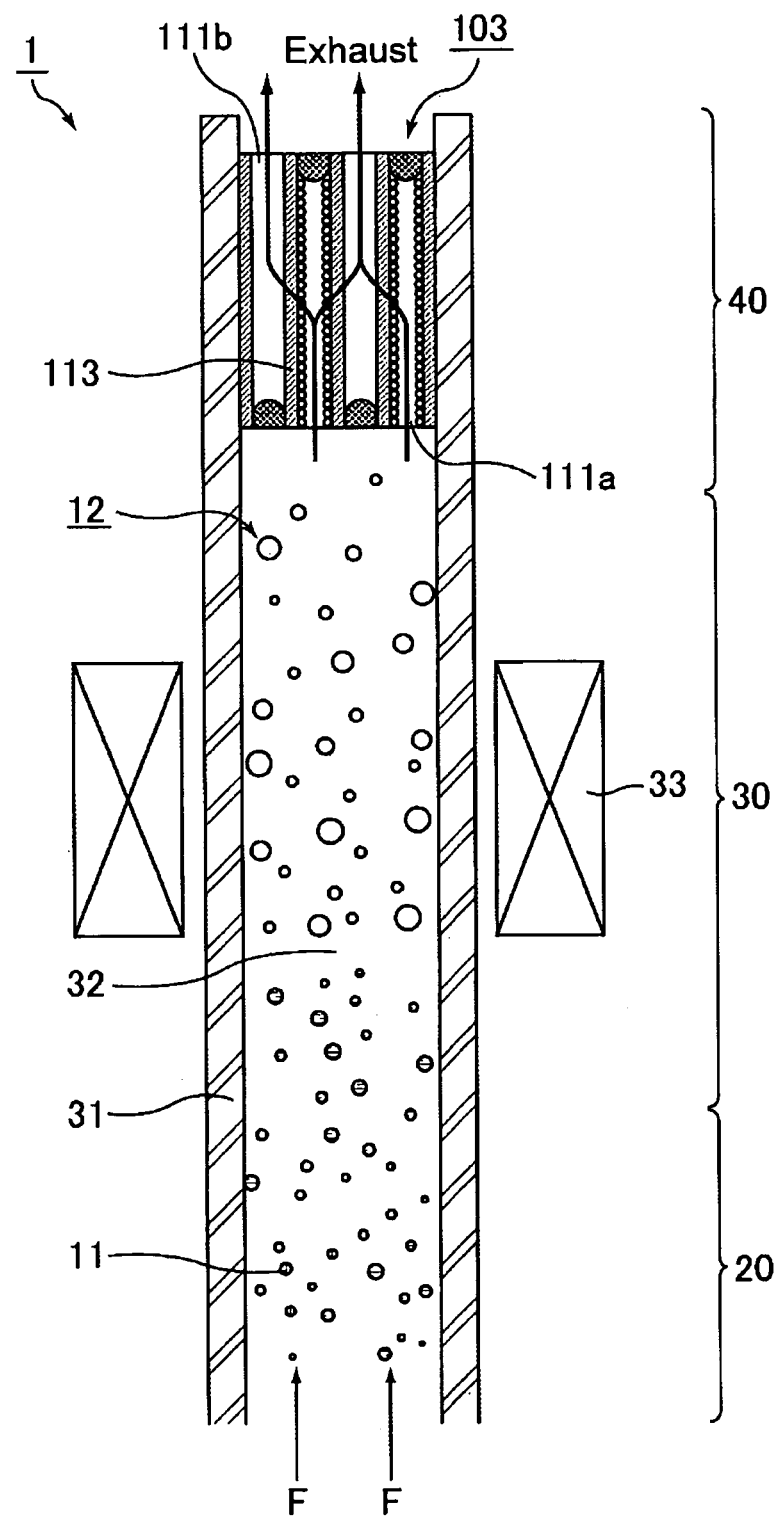
FIG. 10 is a cross-sectional view schematically illustrating an embodiment of a droplet dispersion step and a carrier gas inflow step.

In FIG. 10, the spherical ceramic particles 12 are depicted as white circles.

The spherical ceramic particles are particles of a heat-resistant oxide, and are particles having a spherical shape.

When the droplets contain a heat-resistant oxide precursor, heating the carrier gas causes the heat-resistant oxide precursor to become a heat-resistant oxide (spherical ceramic particles).

In the present embodiment, it is preferable that the pipe wall 31 of the pipe is heated to 100 to 800° C. using the heating mechanism 33, and that the carrier gas F containing the dispersed droplets 11 passes through the pipe in 0.1 to 3.0 seconds.

If the temperature of the heated pipe is less than 100° C., and the time taken for the carrier gas to pass through the pipe is less than 0.1 second, then the water in the droplets may not be able to be evaporated adequately.

On the other hand, if the temperature of the heated pipe exceeds 800° C., and the time taken for the carrier gas to pass through the pipe exceeds 3.0 seconds, then the amount of energy required to produce the honeycomb filter becomes too large, reducing the production efficiency of the honeycomb filter.

In the present embodiment, there are no particular restrictions on the length of the pipe, but the length is preferably from 500 to 3,000 mm.

If the length of the pipe is less than 500 mm, then the water in the droplets cannot be adequately evaporated even if the carrier gas is passed through the pipe slowly. On the other hand, if the length of the pipe exceeds 3,000 mm, then the device used to produce the honeycomb filter becomes too large, reducing the production efficiency of the honeycomb filter.

The spherical ceramic particles 12 remain dispersed within the carrier gas F, flow upward through the carrier gas inflow device 1 carried by the flow of the carrier gas F, and flow into the cells of the ceramic honeycomb substrate 103 in the inflow section 40.

In the present embodiment, a ceramic block formed by bundling a plurality of honeycomb calcined bodies together via adhesive material layers is used as the ceramic honeycomb substrate.

The ceramic honeycomb substrate 103 is disposed at the top of the carrier gas inflow device 1 so as to plug the outlet of the carrier gas inflow device 1.

As a result, the carrier gas F must necessarily flow into the interior of the ceramic honeycomb substrate 103.

Figure 3:
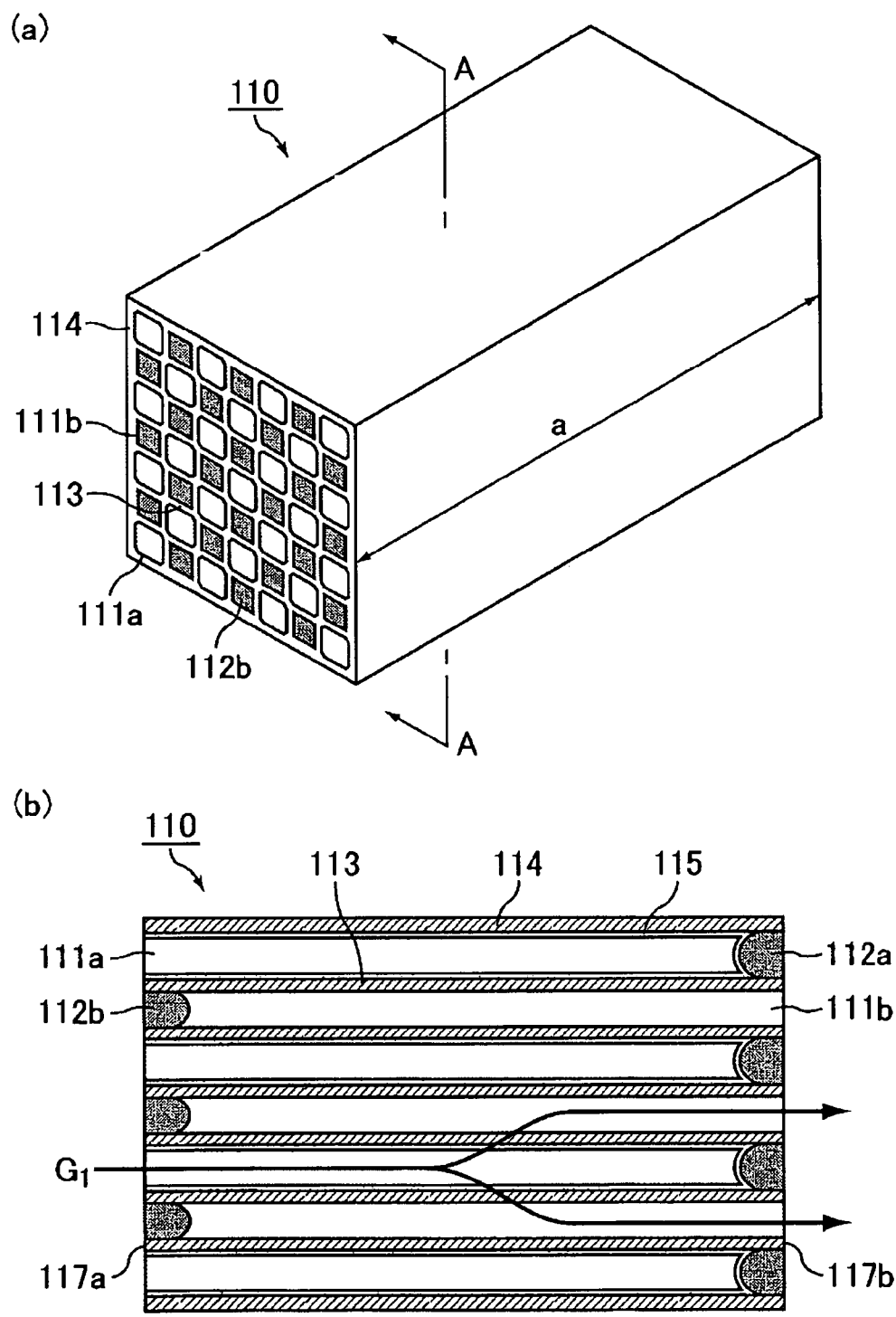
FIG. 3(a) is a perspective view schematically illustrating an example of a honeycomb calcined body that constitutes the honeycomb filter illustrated in FIG. 2.
FIG. 3(b) is a cross-sectional view along the line A-A of the honeycomb calcined body illustrated in FIG. 3(a).

In FIG. 10, a cross section of the honeycomb calcined body that constitutes the ceramic block (a similar cross section to that illustrated in FIG. 3(*b*)) is shown schematically as the cross section of the ceramic honeycomb substrate 103.

In the ceramic honeycomb substrate 103, the end sections of the fluid inlet side cells 111*a* are open, and the fluid outlet side cells 111*b* are sealed.

As a result, the carrier gas F flows into the ceramic honeycomb substrate 103 through the openings of the fluid inlet side cells 111*a*.

When the carrier gas F containing the dispersed spherical ceramic particles 12 flows into the fluid inlet side cells 111*a* of the ceramic honeycomb substrate 103, the spherical ceramic particles 12 accumulate on the surfaces of the cell walls 113 of the ceramic honeycomb substrate 103.

Further, in the present embodiment, the ceramic honeycomb substrate 103 is preferably heated to 100 to 800° C., so that the carrier gas F is introduced into heated cells.

When the ceramic honeycomb substrate 103 is heated to 100 to 800° C., even if any liquid components remain in the spherical ceramic particles 12, these liquid components evaporate, so that the spherical ceramic particles are deposited on the surface of the cell walls in a dried powder state.

The carrier gas F is introduced into the interior of the ceramic honeycomb substrate 103 through the openings of the fluid inlet side cells 111*a*, passes through the cell walls 113 of the ceramic honeycomb substrate 103, and flows out through the openings of the fluid outlet side cells 111*b*.

The carrier gas inflow step is performed using this type of procedure.

Subsequently, the ceramic honeycomb substrate heating step is performed.

The ceramic honeycomb substrate having the spherical ceramic particles adhered to the cell walls as a result of the carrier gas inflow step is heated at a furnace temperature of 1100 to 1500° C. using a heating furnace.

An open air atmosphere, nitrogen atmosphere or argon atmosphere is preferable as the heating atmosphere.

This heating step causes a portion of the spherical ceramic particles to undergo sintering, thus forming crosslinked bodies where the spherical ceramic particles are bound to each other.

Moreover, as a result of the heating, the spherical ceramic particles adhered to the surfaces of the cell walls undergo thermal contraction, which anchors the particles strongly to the surfaces of the cell walls.

The filter layer is formed by the above steps.

In the method for producing the honeycomb filter according to the first embodiment of the present invention, by controlling the inlet velocity with which the carrier gas F is introduced into the ceramic honeycomb substrate 103, the thickness $T_1$ of the inlet side filter layer, the thickness $T_2$ of the central portion filter layer, and the thickness $T_3$ of the outlet side filter layer can each be adjusted.

By adjusting the inlet velocity with which the carrier gas F is introduced into the ceramic honeycomb substrate 103, the thickness of the filter layer can be adjusted so that the thickness increases gradually from the fluid inlet side toward the fluid outlet side.

The conditions for making the thickness of the filter layer increase gradually from the fluid inlet side toward the fluid outlet side require that the velocity of the carrier gas F is preferably set to 4 to 20 mm/s.

Further, by adjusting the inlet velocity with which the carrier gas F is introduced into the ceramic honeycomb substrate 103, the thickness of the filter layer can be adjusted so that a thin layer region in which the thickness of the filter layer is thinnest exists between the fluid inlet side and the fluid outlet side, and the thickness of the filter layer decreases gradually from the fluid inlet side toward the thin layer region, and increases gradually from the thin layer region toward the fluid outlet side.

The conditions for making the thickness of the filter layer satisfy the above type of relationship requires that the velocity of the carrier gas F is preferably set to 1 to 3 mm/s.

In the method for producing the honeycomb filter according to the first embodiment of the present invention, the steps for preparing the ceramic honeycomb substrate containing the honeycomb calcined bodies are described below.

The ceramic honeycomb substrate prepared by the following steps is a ceramic block formed by bundling a plurality of honeycomb calcined bodies together via adhesive material layers.

In the following explanation, silicon carbide is used as an example of the ceramic powder.

(1) A molding step is performed in which a honeycomb molded body is prepared by extrusion molding of a wet mixture containing the ceramic powder and a binder.

Specifically, first, a wet mixture for producing the honeycomb molded body is prepared by mixing silicon carbide powders with different average particle sizes as the ceramic powder, an organic binder, a liquid plasticizer, a lubricant, and water.

Next, the wet mixture is fed into an extrusion molding machine and extrusion molded to prepare a honeycomb molded body with a predetermined shape.

Here, the honeycomb molded body is prepared using a mold that produces a cross-sectional shape having the cell structure (cell shape and cell arrangement) illustrated in FIG. 3(a) and FIG. 3(b).

(2) The honeycomb molded body is cut to a predetermined length and dried using a microwave dryer, hot air dryer, dielectric dryer, reduced pressure dryer, vacuum dryer, or freeze dryer or the like, and a sealing step is then performed in which predetermined cells are packed with a sealing material paste that becomes the sealing material, thereby sealing those cells.

Here, the wet mixture described above can be used as the sealing material paste.

(3) After performing a degreasing step in which the honeycomb molded body is heated in a degreasing furnace to remove the organic matter in the honeycomb molded body, the degreased honeycomb molded body is transported into a calcining furnace and subjected to a calcination step, thereby preparing a honeycomb calcined body of the type illustrated in FIG. 3(a) and FIG. 3(b).

The sealing material paste packed at the end sections of the cells is calcined by the heating and forms the sealing material.

Furthermore, the conditions for the cutting step, the drying step, the sealing step, the degreasing step and the calcination step can employ the types of conditions conventionally used to prepare honeycomb calcined bodies.

(4) A bundling step is performed in which a plurality of honeycomb calcined bodies are sequentially laminated together via an adhesive material paste upon a support stage, thereby preparing a honeycomb aggregated body having a plurality of stacked honeycomb calcined bodies.

For the adhesive material paste, for example, a paste comprising an inorganic binder, an organic binder and inorganic particles is used. Further, the adhesive material paste may also contain inorganic fibers and/or whiskers.

(5) By heating the honeycomb aggregated body, the adhesive material paste is thermally hardened and forms an adhesive material layer, thus preparing a quadrangular prism-shaped ceramic block.

The thermal hardening conditions for the adhesive material paste may be the types of conditions conventionally used when preparing honeycomb filters.

(6) A cutting step is performed in which the ceramic block is cut.

Specifically, by cutting the outer periphery of the ceramic block using a diamond cutter, a ceramic block is prepared with an outer periphery that has been processed to a substantially circular cylindrical shape.

(7) An outer periphery coating layer formation step is performed in which an outer periphery coating material paste is applied to the outer peripheral surface of the substantially circular cylindrical ceramic block, and then dried and solidified to form an outer periphery coating layer.

Here, the adhesive material paste mentioned above can be used as the outer periphery coating material paste. A paste with a different composition from the above adhesive material paste may also be used as the outer periphery coating material paste.

The outer periphery coating layer need not necessarily be provided, and may be provided as required.

By providing the outer periphery coating layer, the shape of the outer periphery of the ceramic block can be neatened, enabling a ceramic honeycomb substrate with a circular cylindrical shape to be obtained.

By performing the above steps, a ceramic honeycomb substrate containing honeycomb calcined bodies can be prepared.

By subsequently subjecting the ceramic honeycomb substrate to the aforementioned droplet dispersion step, carrier gas inflow step, and ceramic honeycomb substrate heating step, the filter layer can be formed on the surface of the cell walls of the ceramic honeycomb substrate, thus preparing a honeycomb filter.

Examples of the functions and effects of the honeycomb filter according to the first embodiment of the present invention and the method for producing the honeycomb filter are described below.

(1) In the honeycomb filter according to the first embodiment of the present invention, the thickness of the filter layer either increases gradually from the fluid inlet side toward the fluid outlet side, or alternatively, a thin layer region in which the thickness of the filter layer is thinnest exists between the fluid inlet side and the fluid outlet side, and the thickness of the filter layer decreases gradually from the fluid inlet side toward the thin layer region, and increases gradually from the thin layer region toward the fluid outlet side.

By forming the fluid outlet side filter layer as a thick layer, the velocity of the exhaust gas at the fluid outlet side can be reduced, thereby reducing the amount of PM deposited at the fluid outlet side. On the other hand, by increasing the velocity of the exhaust gas at the fluid inlet side, the amount of PM deposited at the fluid inlet side can be increased.

However, because the fluid inlet side filter layer is formed as a thin layer, the pressure loss does not increase.

Consequently, the pressure loss for the overall honeycomb filter can be kept low.

Further, because a thick filter layer is provided at the fluid outlet side, a large amount of PM can be accumulated on the outlet side filter layer without any leakage. As a result, the collection efficiency can be increased.

(2) In the honeycomb filter according to the first embodiment of the present invention, the thickness of the filter layer, measured at a single point within an arbitrary region located at a length of 87.5 to 92.5% of the total length of the ceramic honeycomb substrate in the longitudinal direction from the end section at the fluid inlet side, is from 10 to 50 μm.

If the above thickness is less than 10 μm, then there is a possibility that a problem may arise in which a large amount of PM leaks out. Further, if the thickness exceeds 50 μm, then the pressure loss at the fluid outlet side may become too high.

(3) In the honeycomb filter according to the first embodiment of the present invention, the porosity of the honeycomb calcined body is from 55 to 70%.

In a honeycomb filter having a comparatively high porosity of 55 to 70%, PM passes relatively easily through the cell walls and the collection efficiency is comparatively low, and therefore increasing the thickness of the filter layer to improve the collection efficiency is particularly effective.

By increasing the thickness of the outlet side filter layer, a high collection efficiency can be maintained even with a honeycomb filter having a comparatively high porosity. In other words, the concept of increasing the thickness of the outlet side filter layer is particularly suitable for application to a honeycomb filter having a comparatively high porosity.

(4) In the honeycomb filter according to the first embodiment of the present invention, the filter layer is composed of a heat-resistant oxide, and the heat-resistant oxide is at least one type selected from the group consisting of alumina, silica, mullite, ceria, zirconia, cordierite, zeolite and titania.

When the filter layer is composed of a heat-resistant oxide, even if a regeneration process is performed to incinerate the PM, problems such as melting of the filter layer do not occur. As a result, a honeycomb filter having excellent heat resistance can be obtained.

(5) In the honeycomb filter according to the first embodiment of the present invention, the ceramic honeycomb substrate comprises silicon carbide or a silicon-containing silicon carbide.

Silicon carbide and silicon-containing silicon carbides have superior hardness and an extremely high thermal decomposition temperature. As a result, the honeycomb filter becomes a honeycomb filter that exhibits excellent mechanical properties and heat resistance.

(6) In the honeycomb filter according to the first embodiment of the present invention, the cells that constitute the honeycomb calcined body consist of large volume cells and small volume cells, wherein the cross-sectional area of a cross section perpendicular to the longitudinal direction of the large volume cells is larger than the cross-sectional area of a cross section perpendicular to the longitudinal direction of the small volume cells. As a result, compared with a honeycomb filter in which the cross-sectional areas of all the cells are the same, the filtration area is larger, and a larger amount of PM can be accumulated before a regeneration process is performed.

(7) In the honeycomb filter according to the first embodiment of the present invention, the shape of the cross section perpendicular to the longitudinal direction of the large volume cells is substantially octagonal, and the shape of the cross section perpendicular to the longitudinal direction of the small volume cells is substantially tetragonal. Consequently, the large volume cells and the small volume cells can easily be arranged with good symmetry, so that a honeycomb filter having excellent mechanical strength is obtained, where distortion or the like is unlikely to occur.

(8) In the honeycomb filter according to the first embodiment of the present invention, the shape of the cross section perpendicular to the longitudinal direction of the large volume cells is substantially tetragonal, and the shape of the cross section perpendicular to the longitudinal direction of the small volume cells is substantially tetragonal.

As a result, the large volume cells and the small volume cells that constitute the honeycomb calcined body can easily be arranged with good symmetry, so that a honeycomb filter having excellent mechanical strength is obtained, where distortion or the like is unlikely to occur.

In the method for producing the honeycomb filter according to the first embodiment of the present invention, the droplets containing the raw material of the spherical ceramic particles are dispersed in the carrier gas, and the carrier gas is dried at 100 to 800° C. By drying the carrier gas, the moisture within the droplets dispersed in the carrier gas can be removed to form the spherical ceramic particles. Further, if the raw material of the spherical ceramic particles contained in the carrier gas is a precursor to a heat-resistant oxide, the precursor to the heat-resistant oxide can be converted to spherical ceramic particles in the drying step.

When introducing the thus produced spherical ceramic particles into the cells, the flow rate of the carrier gas is adjusted.

When the flow rate of the carrier gas is set to 4 to 20 mm/s, the thickness of the filter layer can be adjusted so as to increase gradually from the fluid inlet side toward the fluid outlet side.

Further, when the flow rate of the carrier gas is set to 1 to 3 mm/s, the thickness of the filter layer can be adjusted so that a thin layer region in which the thickness of the filter layer is thinnest exists between the fluid inlet side and the fluid outlet side, and the thickness of the filter layer decreases gradually from the fluid inlet side toward the thin layer region, and increases gradually from the thin layer region toward the fluid outlet side.

EXAMPLES

The honeycomb filter of the first embodiment of the present invention and the method for producing the honeycomb filter are described below in more detail using specific examples. However, the present invention is not limited solely to these examples.

Example 1

(Preparation of Ceramic Honeycomb Substrate)

First, a molding step was performed by mixing 54.6% by weight of a coarse powder of silicon carbide with an average particle size of 22 μm and 23.4% by weight of a fine powder of silicon carbide with an average particle size of 0.5 μm, to which 4.3% by weight of an organic binder (methyl cellulose), 2.6% by weight of a lubricant (Unilube manufactured by NOF Corporation), 1.2% by weight of glycerol and 13.9% by weight of water were added and kneaded to obtain a wet mixture, which was then extrusion-molded.

In this step, crude honeycomb molded bodies having the same shape as the honeycomb calcined body 110 illustrated in FIG. 3(a) but with no sealing of the cells were prepared.

Next, dried honeycomb molded bodies were prepared by drying the crude honeycomb molded bodies using a microwave dryer. Subsequently, a sealing material paste was packed into predetermined cells of the dried honeycomb molded bodies, thereby sealing the cells. A part of the wet mixture described above was used as the sealing material paste. After sealing the cells, the dried honeycomb molded bodies packed with the sealing material paste were dried again using a dryer.

Subsequently, the dried honeycomb molded bodies with sealed cells were subjected to a degreasing treatment at 400° C. to degrease the dried honeycomb molded bodies, and were then subjected to a calcination treatment in a normal pressure argon atmosphere at 2200° C. for 3 hours.

As a result, quadrangular prism-shaped honeycomb calcined bodies were obtained.

The porosity of the honeycomb calcined bodies measured by the mercury penetration method was 63%.

An adhesive material paste was applied on the honeycomb calcined bodies obtained by the above steps, thus forming adhesive material paste layers, and by thermally hardening the adhesive material paste layers to form adhesive material layers, a substantially prism-shaped ceramic block composed of 16 honeycomb calcined bodies bundled together via the adhesive material layers was prepared.

For the adhesive material paste, an adhesive material paste containing 30% by weight of alumina fibers with an average fiber length of 20 μm, 21% by weight of silicon carbide particles with an average particle size of 0.6 μm, 15% by weight of a silica sol, 5.6% by weight of carboxymethyl cellulose, and 28.4% by weight of water was used.

Subsequently, a circular cylindrical ceramic block with a diameter of 142 mm was prepared by using a diamond cutter to cut the outer periphery of the prism-shaped ceramic block.

Next, an outer periphery coating material paste was applied to the outer peripheral surface of the circular cylindrical ceramic block, and the outer periphery coating material paste was thermally hardened at 120° C. to form an outer periphery coating layer on the outer peripheral portion of the ceramic block.

The same paste as the adhesive material paste described above was used as the outer periphery coating material paste.

As a result of the above steps, a circular cylindrical ceramic honeycomb substrate with a diameter of 143.8 mm and a length of 150 mm was prepared.

(Droplet Dispersion Step and Filter Layer Formation Step)

A filter layer was formed on the ceramic honeycomb substrate using the carrier gas inflow device illustrated in FIG. 10.

The ceramic honeycomb substrate was placed at the top of the carrier gas inflow device as illustrated in FIG. 10.

At this time, the ceramic honeycomb substrate was positioned so that the openings of the large volume cells, as the fluid inlet side cells, faced toward the bottom of the carrier gas inflow device.

A solution containing boehmite, which is a heat-resistant oxide precursor, was prepared as an oxide-containing solution. The boehmite concentration was 3.8 mol/l.

Droplets containing boehmite were then dispersed in the carrier gas by spraying.

The pipe wall of the pipe of the carrier gas inflow device was heated to a temperature of 200° C., and the carrier gas was introduced so as to flow toward the top of the carrier gas inflow device (the ceramic honeycomb substrate side) at a flow rate of 15.8 mm/s, thereby evaporating the moisture within the droplets dispersed in the carrier gas. As a result of the evaporation of the moisture in the droplets that occurred as the carrier gas passed through the pipe, the droplets were converted to spherical alumina particles.

The length of the pipe was 1200 mm.

The carrier gas flow rate was calculated on the basis of formula (1), from the gas volume introduced into the ceramic honeycomb substrate per unit of time of 3,173,900 $mm^3/s$, and the PM trapping area of the ceramic honeycomb substrate of 200,340 $mm^2$.

The carrier gas containing the dispersed spherical alumina particles was introduced into the cells of the ceramic honeycomb substrate, and the spherical alumina particles were adhered to the surfaces of the cell walls.

Subsequently, the ceramic honeycomb substrate was removed from the carrier gas inflow device, and heated in a calcining furnace at 1350° C. for 3 hours in an open air atmosphere.

As a result of the above steps, a honeycomb filter was produced which had a filter layer composed of alumina particles formed on the surfaces of the cell walls.

Electron microscope photographs of the filter layer of the honeycomb filter obtained by the above steps are shown in FIG. 6(a), FIG. 6(b) and FIG. 6(c).

The conditions used for acquiring the SEM photographs were as follows: model FE-SEM S-4800 manufactured by Hitachi, Ltd., a backscattered electron image, an accelerating voltage of 15.0 kV, and a magnification of 500×. For photographs acquired in the range $W_1$, the range $W_2$ and the range $W_3$ illustrated in FIG. 4, the thickness of the filter layer was measured using the measurement method described above.

The thickness ($T_1$) of the inlet side filter layer shown in FIG. 6(a) was 3.1 μm, the thickness ($T_2$) of the central portion filter layer was 7.3 μm, and the thickness ($T_3$) of the outlet side filter layer was 46.2 μm. The relationship between the thickness values of the filter layer satisfied $T_1<T_2<T_3$, and it can be stated that the thickness of the filter layer increased gradually from the fluid inlet side toward the fluid outlet side.

Example 2

With the exception of altering the carrier gas flow rate from that in Example 1 to 1.8 mm/s, a honeycomb filter was produced in the same manner as Example 1.

Electron microscope photographs of the filter layer of the honeycomb filter obtained by the above steps are shown in FIG. 8(a), FIG. 8(b) and FIG. 8(c).

The SEM photographs were acquired under the same acquisition conditions as Example 1, and for photographs acquired in the range $Z_1$, the range $Z_2$ and the range $Z_3$ illustrated in FIG. 7, the thickness of the filter layer was measured using the measurement method described above.

The thickness ($T_1$) of the inlet side filter layer shown in FIG. 8(a) was 26.3 μm, the thickness ($T_2$) of the thin layer region was 18.4 μm, and the thickness ($T_3$) of the outlet side filter layer was 33.6 μm. The relationship between the thickness values of the filter layer satisfied $T_1 > T_2$ and $T_2 < T_3$, and it can be stated that a thin layer region in which the thickness of the filter layer was thinnest existed between the fluid inlet side and the fluid outlet side, and that the thickness of the filter layer decreased gradually from the fluid inlet side toward the thin layer region, and increased gradually from the thin layer region toward the fluid outlet side.

The carrier gas flow rate was calculated on the basis of formula (1), from the gas volume introduced into the ceramic honeycomb substrate per unit of time of 352,600 mm³/s, and the PM trapping area of the ceramic honeycomb substrate of 200,340 mm².

In the honeycomb filters produced in Example 1 and Example 2, having the filter layers described above, because the thickness of the fluid outlet side filter layer is greater than the thickness of the fluid inlet side filter layer (namely, $T_1 < T_3$ is satisfied), a large amount of PM is not deposited at the fluid outlet side, and therefore any increase in pressure loss can be prevented. Further, because the thickness of the fluid outlet side filter layer is large, PM can be trapped more readily, and the collection efficiency improves.

OTHER EMBODIMENTS

In the honeycomb filter according to the first embodiment of the present invention, the filter layer is formed only on the surface of the cell walls of those cells in which the end section at the fluid inlet side is open and the end section at the fluid outlet side is sealed.

However, in a honeycomb filter according to another embodiment of the present invention, the filter layer may be formed not only on the surface of the cell walls of cells in which the end section at the fluid inlet side is open and the end section at the fluid outlet side is sealed, but also on the surface of the cell walls of cells in which the end section at the fluid inlet side is sealed and the end section at the fluid outlet side is open.

This type of honeycomb filter can be produced by immersing the ceramic honeycomb substrate in a slurry containing the spherical ceramic particles that has been prepared in advance, and then heating the resulting product.

In a method for producing a honeycomb filter according to an embodiment of the present invention, the droplets may contain heat-resistant oxide particles as the raw material of the ceramic particles.

When the droplets contain heat-resistant oxide particles, particles of the heat-resistant oxide can be obtained by heating the carrier gas to remove the moisture within the droplets. Moreover, by introducing particles of the heat-resistant oxide into the cells, a filter layer composed of particles of the heat-resistant oxide can be formed.

Further, a filter layer composed of particles of the heat-resistant oxide can also be formed by introducing the droplets containing the heat-resistant oxide particles into the cells, and then removing the moisture within the droplets.

In a honeycomb filter according to an embodiment of the present invention, all of the cells of the honeycomb calcined bodies that constitute the honeycomb filter may have the same shape in a cross section perpendicular to the longitudinal direction, and both the cells that are sealed and the cells that are open at one end surface of the honeycomb calcined bodies may have the same area for cross sections perpendicular to the longitudinal direction of the cells.

In a honeycomb filter according to an embodiment of the present invention, the ceramic honeycomb substrate (ceramic block) may be formed from a single honeycomb calcined body.

This type of honeycomb filter formed from a single honeycomb calcined body is also called an integrated type honeycomb filter. Cordierite or aluminum titanate or the like can be used as the main constituent material of an integrated type honeycomb filter.

In a honeycomb filter according to an embodiment of the present invention, the shape of the cross section of each cell of a honeycomb calcined body in a direction perpendicular to the longitudinal direction of the honeycomb calcined body is not limited to a substantially tetragonal shape, and can be an arbitrary shape such as a substantially circular shape, substantially elliptical shape, substantially pentagonal shape, substantially hexagonal shape, substantially trapezoidal shape, or substantially octagonal shape. Further, a mixture of various shapes may also be used.

In the honeycomb filter of the present invention, the essential structural elements are that the filter layer is formed on the surface of the cell walls of the ceramic honeycomb substrate, and that the thickness of the filter layer either increases gradually from the fluid inlet side toward the fluid outlet side, or alternatively, a thin layer region in which the thickness of the filter layer is thinnest exists between the fluid inlet side and the fluid outlet side, and the thickness of the filter layer decreases gradually from the fluid inlet side toward the thin layer region, and increases gradually from the thin layer region toward the fluid outlet side.

By appropriate combination of these essential structural elements with the various configurations described in the first embodiment and the other embodiments (for example, the structure of the filter layer, the method for forming the filter layer, the cell structure of the honeycomb calcined bodies, and the honeycomb filter production steps and the like), the desired effects can be obtained.

DESCRIPTION OF THE REFERENCE NUMERALS

1 Carrier gas inflow device
11 Droplets
12 Spherical ceramic particles
100 Honeycomb filter
103 Ceramic honeycomb substrate (ceramic block)
110, 120, 130, 140 Honeycomb calcined body
111a, 111b, 121a, 121b, 131a, 131b, 141a, 141b Cell
112a, 112b Sealing material
112S Surface of sealing material exposed inside cell
113 Cell wall
115 Filter layer
F Carrier gas
$G_1$ Exhaust gas
$Z_2$ Thin layer region

The invention claimed is:

1. A honeycomb filter comprising:
    a ceramic honeycomb substrate in which a multitude of cells through which a fluid flows are disposed in parallel in a longitudinal direction and are separated by cell walls, each cell being sealed at an end section at either a fluid inlet side or a fluid outlet side, and
    a filter layer which, among surfaces of the cell walls, is formed on a surface of the cell walls of those cells in which the end section at the fluid inlet side is open and the end section at the fluid outlet side is sealed by a sealing material, wherein
    a thin layer region in which a thickness of the filter layer is thinnest exists between the fluid inlet side and the fluid outlet side, and a thickness of the filter layer decreases gradually from the fluid inlet side toward the thin layer region, and increases gradually from the thin layer region toward the fluid outlet side.

2. The honeycomb filter according to claim 1, wherein among surfaces that constitute the sealing material, the filter layer is formed on surfaces of the sealing material that are exposed inside the cells.

3. The honeycomb filter according to claim 1, wherein a thickness of the filter layer, measured at a single point within an arbitrary region located at a length of 87.5 to 92.5% of a total length of the ceramic honeycomb substrate in the longitudinal direction from the end section at the fluid inlet side, is from 10 to 50 μm.

4. The honeycomb filter according to claim 1, wherein a porosity of the ceramic honeycomb substrate is from 55 to 70%.

5. The honeycomb filter according to claim 1, wherein the filter layer is composed of a heat-resistant oxide.

6. The honeycomb filter according to claim 5, wherein the heat-resistant oxide is at least one selected from the group consisting of alumina, silica, mullite, ceria, zirconia, cordierite, zeolite and titania.

7. The honeycomb filter according to claim 1, wherein the ceramic honeycomb substrate comprises silicon carbide or a silicon-containing silicon carbide.

8. The honeycomb filter according to claim 1, wherein
    the cells that constitute the ceramic honeycomb substrate consist of large volume cells and small volume cells, and
    a cross-sectional area of a cross section perpendicular to a longitudinal direction of the large volume cells is larger than a cross-sectional area of a cross section perpendicular to a longitudinal direction of the small volume cells.

9. The honeycomb filter according to claim 8, wherein a shape of the cross section perpendicular to a longitudinal direction of the large volume cells is substantially octagonal, and a shape of the cross section perpendicular to a longitudinal direction of the small volume cells is substantially tetragonal.

10. The honeycomb filter according to claim 8, wherein a shape of the cross section perpendicular to a longitudinal direction of the large volume cells is substantially tetragonal, and a shape of the cross section perpendicular to a longitudinal direction of the small volume cells is substantially tetragonal.

11. The honeycomb filter according to claim 8, wherein a shape of the cross section perpendicular to a longitudinal direction of the large volume cells is substantially hexagonal, and a shape of the cross section perpendicular to a longitudinal direction of the small volume cells is substantially hexagonal.

* * * * *